INVENTORS
JAMES L. ATKINSON
DONALD G. SCHULTZ

ATTORNEY

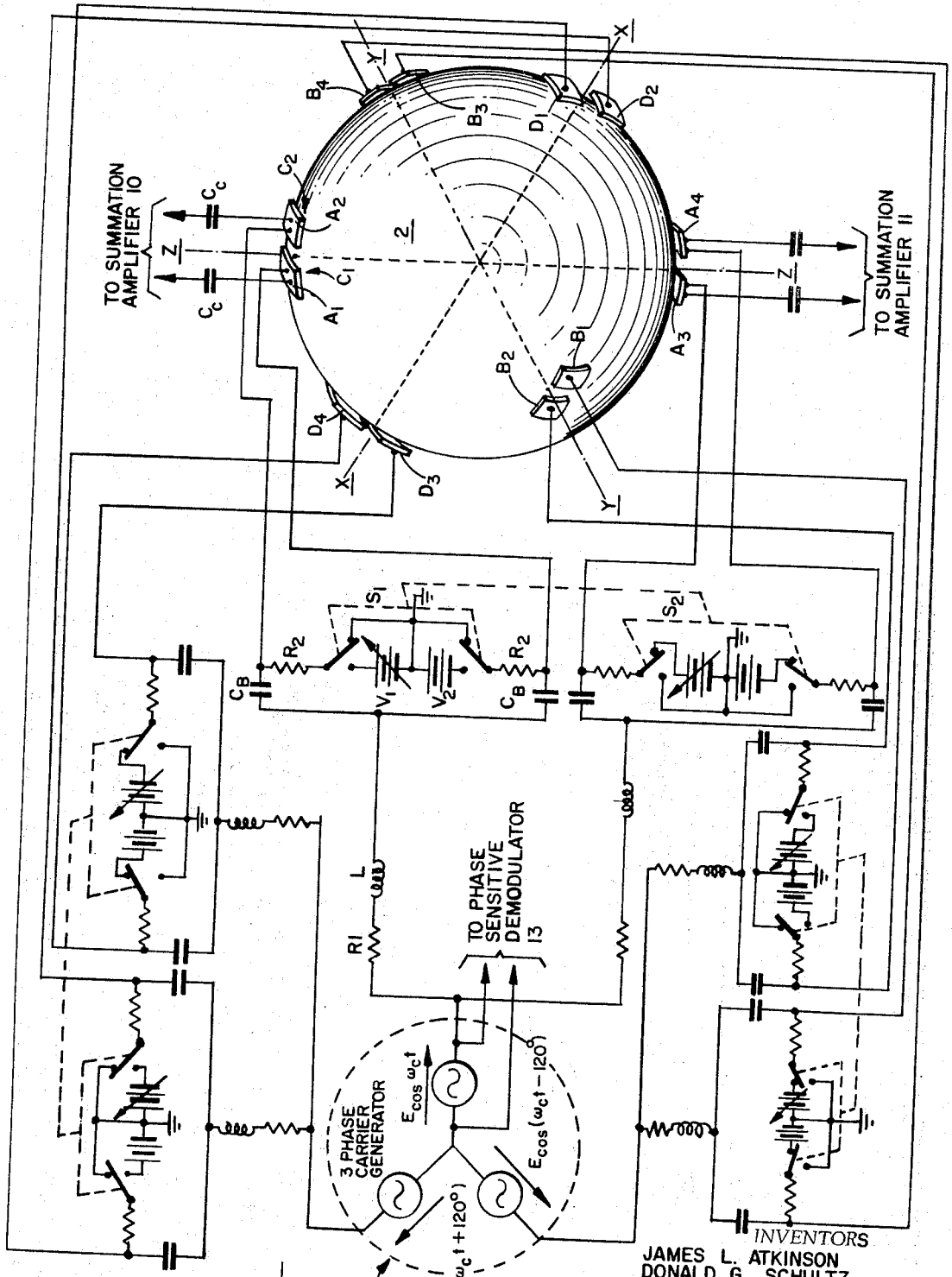

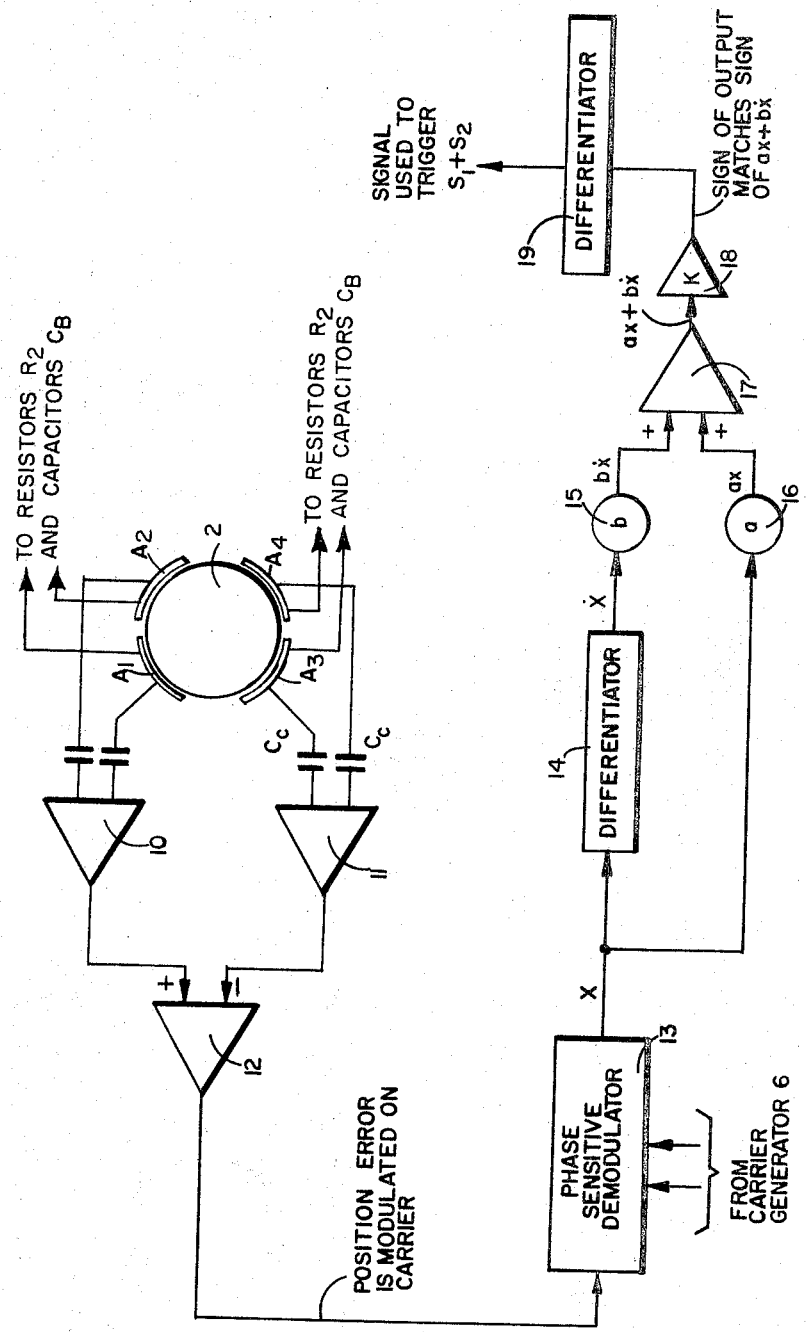

United States Patent Office 3,338,644
Patented Aug. 29, 1967

3,338,644
ELECTROSTATIC SUPPORT CIRCUIT
James L. Atkinson, La Mirada, Calif., and Donald G. Schultz, Tucson, Ariz., assignors to North American Aviation, Inc.
Filed Mar. 22, 1965, Ser. No. 441,808
13 Claims. (Cl. 308—10)

ABSTRACT OF THE DISCLOSURE

An electrostatic support circuit for supporting an electrically conductive spherical member along three mutually orthogonal axes in which six pairs of plates are arranged symmetrically around the conductive member with two pairs of plates arranged along each of the axes and on opposite sides of the member. A plurality of voltage sources are provided to establish a DC potential between each of the plates and the conductive member. A plurality of switches are coupled between the batteries and the plates and are operative to selectively apply the DC potential to the plates as a function of changes in the position of the conductive member relative to the axes.

---

The present invention relates to a means for electrostatically supporting a body in space, and more particularly to a three-dimensional, frictionless support means for supporting the rotor of a gyroscope.

An electrostatic gyroscope is a free-rotor type gyroscope in which spherical-bearing support forces are derived from an electric field. The rotor is generally an aluminum or beryllium sphere which may be either solid or hollow. The electrostatic support means consists generally of six pairs of spherical segment electrodes dispersed about the rotor.

Prior known methods for electrically supporting a rotor of a gyroscope are disclosed, for example, in U.S. Patent No. 3,098,679, issued July 23, 1963, entitled "Passive Control Circuit for Electrostatic Bearing," by William F. DeBoice and U.S. Patent No. 2,919,583, issued Jan. 5, 1960, entitled, "Magnetically Supported Gyroscope," by Herman M. Parker.

Prior known levitation control systems based on proportional control using AC voltages have disadvantages in both the proportional control and the use of AC voltages. With regard to the proportional control, consider, for example, the single-degree-of-freedom, vertical axis case. This is where the rotor is supported against gravity and forces acting along the gravity vector. In a zero $g$ field, both the top and bottom plates exert an equal and opposite force on the rotor, and assuming balanced conditions, the rotor is centered in its housing. In the presence of a $g$ level, the rotor is displaced from its center position, and the electrostatically produced top and bottom forces are unbalanced in direct proportion to the magnitude of the $g$ loading, in order to restore dynamic equilibrium. Under a steady fixed $g$ load, the final steady state rotor position is displaced from the desired center position by an amount proportional to the assumed constant acceleration. One deficiency with this system lies in the fact that the forces of the two plates are pulling against each other, and it is only the net difference force which counters an acceleration caused external force. Thus, there is a loss in efficiency in the power amplifiers connected to the plates, and there is a requirement that these amplifiers be linear over the expected range of inputs. The second deficiency arises due to the steady offset of the rotor from the center. This has an adverse effect on over-all gyro performance, and tends to increase the probability of arcing.

With regard to the use of AC control, it is to be noted that the maximum $g$ loading which the gyro can withstand is based on the maximum electric field the gap can withstand before arcing occurs. Now, the electrostatic force is proportional to the average of the square of the electric field. Thus, when comparing a steady DC field with an AC field of equal peak value, the force exerted by the AC field is only one-half that of the steady state field. It, thus, may be seen that the disadvantage of using AC control is that it is capable of only one-half the maximum $g$ loading of a comparable DC control system.

It may be also shown that DC control is theoretically better than AC control by a factor of at least two-to-one. This argument is based on the maximum allowable field strength before breakdown or arcing occurs. In general, these freely supported gyroscope rotors are housed in a high vacuum, air, the viscous damping fluid having been removed, so that no significant damping may be attributable to air. Since no direct viscous damping forces are present, any damping that does exist must be produced electrically. As previously noted, with proportional control the rotor position at any particular time need not be the centered position. For instance, the rotor may be closer to the bottom plates than to the top plates and have a high upward velocity (such as at the liftoff of a missile). Because the control signal is a function of translational velocity of the rotor with respect to the supporting member as well as position, the control system may well require that the bottom plate also be at a higher voltage than the top plate. In fact this is exactly what must occur if undesirable overshoot and long settling times are to be avoided. Thus, if the system had been designed for maximum allowable field strength in the steady state, breakdown and arcing would occur during acceleration or deceleration.

It is possible to make a further point in regard to AC proportional control systems that depend on resonance phenomena. In this case, transient terms are present, as well as steady state terms, and thus the instantaneous value of the AC voltage may be higher than the expected peak value. The effect is to increase the field strength, and since the system is field strength limited, this factor also must be taken into account in design.

The present invention pertains to a control system which supports the rotor in a DC manner and which derives position information in an AC manner. Control is utilized to maintain the rotor at or near the desired center position over the complete range of $g$ loading, for which it is designed, and to increase the theoretical maximum $g$ loading for a given allowable field strength at the rotor mass. Basically speaking, applicants' invention operates by applying a DC voltage to one plate pair. An electrostatic field is thus created between the plate pair and the gyro rotor, which tends to pull the rotor toward the plate pair. A second plate pair is located opposite the first named plate pair. A DC voltage is also applied to it, but not at the same time; the electrostatic field existing between the second plate pair and the gyro rotor then attracts the rotor toward the second plate pair. By controlling the duration that the DC voltage is supplied to each plate pair, it is possible to cycle, or suspend the gyro rotor in a centered position. As the frequency of the switching is increased, the rotor will more closely approach the center position and appear stationary.

It is, therefore, an object of this invention to provide an improved electrostatic support circuit.

It is a further object of this invention to provide electrical damping to stabilize a gyro rotor.

It is still another object of this invention to provide a support circuit for maintaining a gyroscope rotor at or near the desired centered position over the complete range of $g$ loading for which it is designed.

It is still another object of this invention to increase the maximum $g$ loading for a given allowable field strength and rotor mass.

It is another object of this invention to provide a highly efficient DC electrostatic control system for supporting a gyroscope rotor.

It is still another object of this invention to provide a DC support system for supporting a conductive member in which no direct electrical connection to the conducting member is required.

Further objects of this invention will become more apparent from the following description taken in connection with the accompanying drawings in which:

FIG. 4 is a schematic illustrating a three-axes DC support and AC position sensing system; and FIG. 5 is a schematic illustrating a position sensing circuit.

When comparing a steady DC field with an AC field of equal peak value, it can be shown that the force exerted by the AC field is only half that of the steady state field. This is clearly shown by the following equations.

Steady state,
$$E_{DC} = K_1 V$$

Alternating field,
$$e_{AC} = K_1 V \cos \omega_c t$$

Force due to steady field,
$$F_{DC} = K_2 V^2$$

Instantaneous force due to the alternating field,
$$f_{AC} = K_2 V^2 \cos^2 \omega_c t$$
$$= K_2 [\tfrac{1}{2} V^2 + \tfrac{1}{2} V^2 \cos 2\omega_c t]$$

The second term above has an average value of zero, such that the effective AC force is
$$f_{AC} \text{ effective} = \tfrac{1}{2} K_2 V^2$$

In the above, V is the potential across the gap, and $\omega_c$ is the AC carrier frequency in radians per second.

Thus, under the assumption that the supported member is initially in its centered position, it is seen that the disadvantage of using AC control for support is that it is capable of only one-half the maximum $g$ loading of a comparable DC control system.

Figure 1:
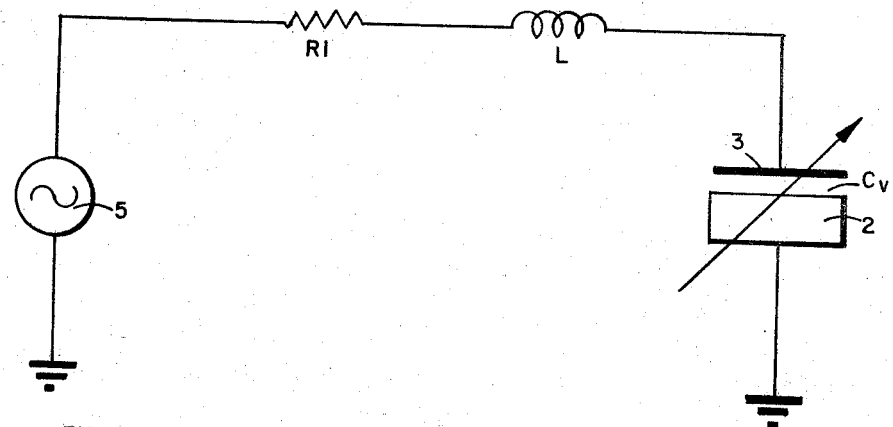
FIG. 1 is a simplified schematic illustrating a one-plate position sensing circuit.
Figure 2:
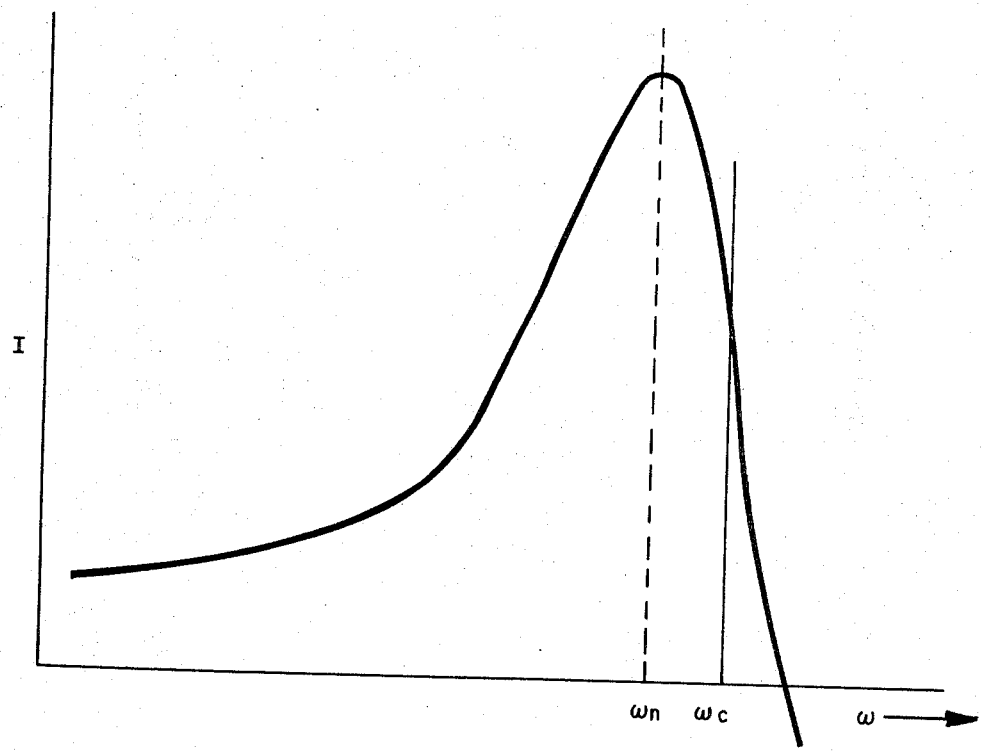
FIG. 2 is a graph illustrating a typical series resonant circuit frequency response curve.

Referring to FIG. 1, an AC generator 5, called the "carrier generator," supplies the position sensing signal for the DC support control system. A resistor R1, an inductor L, a fixed plate 3, an electrically conductive supported member 2 and a variable capacitor $C_V$ created by the spacing between fixed plate 3 and supported member 2 form a series resonant circuit. The inductance of inductor L is chosen to resonate with the normal capacity between plate 3 and supported member 2. The frequency of resonance $\omega_n$ is designed to be slightly lower than the carrier generator frequency. Supported member 2 is connected to AC ground in this one-axis-embodiment of an AC position sensing circuit. A typical frequency response curve for the circuit of FIG. 1 is shown in FIG. 2. The choice of the resonant frequency $\omega_n$ with respect to the carrier frequency $\omega_c$ provides an inherent sensing and feedback control system. If the supported member is moved upwards, the capacity increases, the resonant frequency decreases, and the peak of the frequency response curve in FIG. 2 moves to the left. This lowers the voltage across the supported member, and thus the voltage across the supported member is a measure of the position of the member. When utilizing a three-axis support and positioning system with a gyroscope rotor as the supported member, this voltage would be measured with respect to ground, as the rotor is inaccessible, but at virtual AC ground. (This point will be clarified later.)

It is to be noted that the force on the supported member is a function of the potential difference between the supported member and the fixed plate. As the member moves upward, the voltage decreases, and the supported member tends to drop back to its original position. It is not intended to take advantage of this inherent feedback situation. In fact, this is exactly the situation that is trying to be avoided through the use of a DC support system.

To avoid this proportional type action described above, the AC carrier generator voltage is made small compared to the DC sources that will be used to support member 2. Since electrostatic force is proportional to voltage squared, if the AC peak voltage across support plate 3 is $\tfrac{1}{10}$ of the DC voltage, then $\tfrac{1}{200}$ of the force exerted on the supported member is contributed by the AC voltage. The AC voltage across the gap should be kept to a minimum, as the breakdown voltage is determined by the instantaneous voltage, and the AC adds to the DC. Hence, to realize the advantages cited in the previous section, the AC contribution should be kept small.

Figure 3:
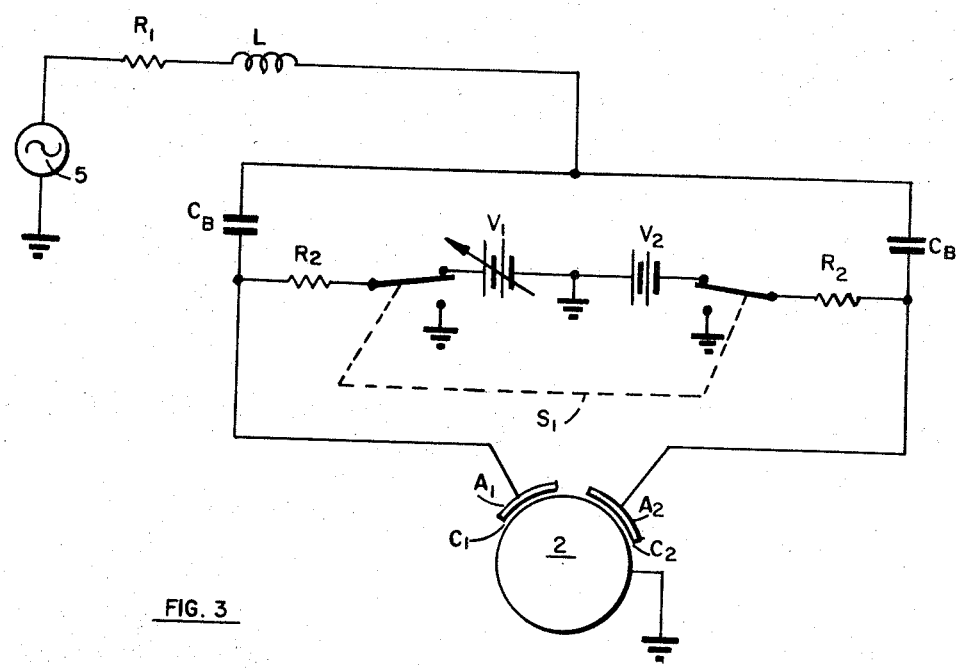
FIG. 3 is a schematic illustrating simplified DC electrostatic support and AC position sensing circuits.

Referring now to FIG. 3, the combining of the AC carrier generator position sensing circuits and the DC supply support circuits are shown. A pair of capacitors $C_B$ are used to isolate the DC support voltages from the AC sensing circuits. A switch $S_1$ is used to connect a pair of plates $A_1$ and $A_2$, via resistors $R_2$, alternately to voltage sources $V_1$ and $V_2$, respectively, and ground. With switch $S_1$ connecting the voltage sources $V_1$ and $V_2$ to plates $A_1$ and $A_2$, respectively, capacitors $C_1$ and $C_2$ formed by the gap between plate $A_1$ and supported member 2 (sometimes herein referred to as a gyroscope rotor and/or rotor), and plate $A_2$ and rotor 2 are charged. Thus, an electrostatic field exists between the plates and the gyroscope rotor, which tends to pull the rotor towards the pair of plates.

Assume that when the rotor is in its centered position, the force exerted on the rotor by the plates is equivalent to that produced by an acceleration of K $g$'s. Similarly, if the switch were in the ground position, the plates would be shorted and in turn would exert 0 force, while the acceleration of gravity would exert a force of $g$ on the centered gyroscope rotor. By controlling the duration which the voltage supplies $V_1$ and $V_2$ are connected to plates $A_1$ and $A_2$, it is possible to balance (support) the gyroscope rotor in the centered position against a constant or variable counterforce up to K $g$'s.

With respect to FIG. 3, note that DC voltages are being used to produce the required electrostatic force. The advantages over AC voltage support have already been noted. Furthermore, the DC voltage is being used in a circuit which has no associated inductance. Thus, although transients exist at the time of switching, the instantaneous value of the voltage between the plates and the gyro rotor never exceeds the value of the DC voltage sources. Thus, the gap is never subjected to a difference in potential greater than the DC supply (battery) voltage. Also, since the rotor is forced to remain in the near vicinity of the origin, the spacing between the plates and the gyroscope rotor is essentially constant. Since both applied voltage and spacing are constant, the gap may be stressed to theoretically maxium field strength. This maximizes the force exerted by each plate to the theoretical maximum, and, hence, the maximum acceleration that the gyroscope can withstand is also realized.

Note also that although the gyroscope rotor is in constant motion, the frequency of its limit cycle is limited only by the requirements of velocity and position sensing and switching. Thus, the frequency of the limit cycle is extremely high in comparison to the natural frequencies of the associated circuits and systems with which and in which the gyroscope is used. Consequently, the gyroscope rotor will appear to the rest of the circuitry as though it is in its average, or centered position. The variable voltage supply $V_1$ may be used to finely adjust the centering position of gyroscope rotor 2.

Referring to FIG. 4, supported member 2 is an ungrounded gyroscope rotor, constructed from a light weight conductive material such as beryllium or aluminum. Member 2 is formed in the shape of a sphere which may be either solid or hollow.

Rotor 2 is supported about three-mutually orthogonal axes X, Y and Z shown passing through the center of spherical rotor 2.

Six pairs of spherical support plates $A_1$–$A_2$, $A_3$–$A_4$, $B_1$–$B_2$, $B_3$–$B_4$, $D_1$–$D_2$, $D_3$–$D_4$, are symmetrically arranged in opposing pairs with respect to axes X, Y and Z on each side of rotor 2.

A three-phase AC carrier generator 6 has each of its phases connected by a circuit consisting of an inductor L, a resistor $R_1$ and capacitors $C_B$ to one set of spherical plates and by an identical circuit to the opposite pair of spherical plates. Each phase of the AC carrier generator thereby supplies the position sensing signal needed for one axis of position sensing. Each phase of the carrier generator looks into a similar load; therefore, the load is balanced and no common return is necessary for the position sensing signal. Rotor 2 is at effective DC ground due to the opposite polarity and substantially equal magnitude of the voltages $V_1$ and $V_2$ applied to each pair of support plates. The load seen by DC supplies $V_1$ and $V_2$ appears as a voltage divider or bridge circuit, the arms of which are equal in reactance or resistance; therefore, the voltage is divided equally across the plates and the rotor effecting a DC ground.

A switch $S_2$ operates upon a DC support circuit connected to plates $A_3$–$A_4$ identical to the one connected to plates $A_1$–$A_2$.

The other two remaining axes' support and position sensing circuits are identical in construction and operation.

Switches $S_1$ and $S_2$ are illustrated as manual types, for simplicity. It will be obvious to those persons skilled in the art that a substitution of various well known types of electronic switches may be made to maintain a completely automatic system. FIG. 5 discloses one possible configuration for obtaining the necessary control signals for activating electronic type switches.

In FIG. 4 capacitors $C_B$ as previously stated prevent the control plates from being at DC ground, and resistors $R_2$ prevent the control plates from being at AC ground. As long as $R_2$ is large compared to the reactance of $C_1$ or $C_2$, the AC sensing circuit is relatively unaffected by the presence of the DC control circuit. Also, an added advantage is that as long as $R_2$ is small compared to leakage resistance, leakage resistance becomes relatively unimportant.

The previous assumptions were that the operation of switch $S_1$ was perfect. Suppose switch $S_1$ does close in zero time, relay type operation so desirable here, would not be also accomplished in zero time, as the capacitors formed between the plates and the gyroscope rotor must charge before force is applied to the gyroscope rotor. In the circuit of FIG. 4, the charge time constant of $C_1$ is $R_2(C_1+C_B)$, and for $C_2$ the time constant is $R_2(C_2+C_B)$. Hence $C_B$ should be small, as it parallels $C_1$ or $C_2$ in the charging circuit of the DC control system. As $C_B$ is made smaller, more of the AC carrier generator voltage is dropped across $C_B$, as it is in series with $C_1$ or $C_2$.

It has been shown that position signals are available at each plate of each of the pairs of control plates, and that these pairs of control plates produce their regulating forces according to the position of switches $S_1$ and $S_2$. As yet, no discussion has been undertaken as to the logic or the means by which $S_1$ and $S_2$ are forced to operate.

The operation of ganged switches $S_1$ and $S_2$ is dependent upon position and velocity information that is derived from the AC carrier voltage that exists at each of the support plates.

Reference is now made to FIG. 5 which indicates the mode of operation for the vertical axis. The support circuit of FIG. 4 has been omitted to avoid confusion.

When gyroscope rotor 2 is in its centered position, the magnitude of the voltage at control plates $A_1$ and $A_4$ with respect to ground are equal. Consider a small vertical displacement of the gyroscope rotor in the upward direction. As previously mentioned, the magnitude of the AC voltage on the top pair of plates $A_1$ and $A_2$ decreases. There is a corresponding increase in the AC voltage on the bottom pair of plates $A_3$ and $A_4$. Note that the voltage from plates $A_1$ and $A_2$ are added in an amplifier 10 and that the voltages from plates $A_3$ and $A_4$ are added in a summation amplifier 11. There are two reasons for this. One is to preserve symmetry so that all circuits and mechanical lag will be identical for each plate. The other is to achieve an average measure of the vertical position of the gyroscope rotor. In an instance where the gyroscope rotor does not move in an exact vertical direction, but up and to the side, the voltage on either plate will indicate an inexact location of the gyroscope rotor. A better measure of the gyroscope rotor position would be obtained by considering the average value of the readings on plates $A_1$ and $A_2$ or $A_3$ and $A_4$. This factor is of lesser importance when the gyroscope rotor is forced to stay nearer and nearer to its centered position.

From FIG. 5 it is seen that the average AC carrier voltage from the top pair of control plates $A_1$ and $A_2$ is compared with the average AC carrier voltage from the bottom pair of the control plates $A_3$ and $A_4$. This comparison is shown taking place in a differential amplifier 12. When the gyroscope rotor is in its centered position, the output of the differential amplifier is zero. When the gyroscope motor is displaced from its centered position in a vertical direction, the output of the differential amplifier is an AC carrier voltage. The magnitude of the output is a measure of the amount of error, and the phase is a measure of the direction of error. This signal is demodulated by a phase sensitive demodulator 13, utilizing a reference frequency from AC generator 6, the output of which is a DC signal whose amplitude is a measure of the amount of error and whose sign is a measure of the direction of error.

To produce a signal proportional to velocity, the error voltage X is differentiated by a differentiator 14 to produce $\dot{X}$, the velocity. Both signals are weighted by amplification factors $a$ and $b$, which are generated by multipliers 15 and 16, respectively, and the resulting two voltages added in a summation amplifier 17 to produce $aX+b\dot{X}$. The equation $aX=-b\dot{X}$ defines the switching boundary that governs the time of switching of $S_1$ and $S_2$. The quantity $aX+b\dot{X}$ is amplified by a high gain amplifier 18, such that the output of amplifier 18 is always saturated in either the + or − direction. Thus the output of amplifier 18 reads the sign of $aX+b\dot{X}$. As the sign of $aX+b\dot{X}$ changes, the output of amplifier 18 changes rapidly from one saturated steady state to another. Switches $S_1$ and $S_2$ are triggered by a pulse generated by differentiating the essentially square wave output of amplifier 18 in the differentiator 19.

There are two factors that are of primary importance in the operation of the disclosed embodiments. The factors concerned are the speed of operation and the choice of the relative size of weighting factors $a$ and $b$.

The speed of operation is determined primarily by the time required to demodulate the AC carrier voltage that appears at the output of differential amplifier 12. Under the assumption that demodulation can be accomplished with a time constant 5 to 10 times the period of the AC carrier frequency, it is seen that the higher the AC frequency, the faster the demodulation may be accomplished. Also at higher frequencies the capacitance from control plate to rotor presents a smaller impedance, and may be thus parallel with a smaller $R_2$ resistor in series with the supply voltages $V_1$ and $V_2$. By decreasing $R_2$, the voltage on the control plates rises more rapidly once $S_1$ and $S_2$ have been switched.

The choice of $a$ and $b$ determines the so-called switching boundary in the phase space on which the behavior of this purely inertial system may be described. The choice of switching boundaries and the behavior of a purely inertial system, once switching boundaries have been determined, is one of the most well documented phenomena in non-linear control theory.

In summary, electronic switches connect a DC voltage source between pairs of top and bottom plates as a function of the position and velocity of the rotor in such a way that the gyroscope rotor is always maintained in the near vicinity of the center position. When the DC voltage is removed from the plates, the voltage charge on the capacitors formed between the plates and the rotor is discharged. Ideally, if positioning and velocity sensing were perfect, and if switching and charging accomplished in zero time, the switching rate would be infinite and the rotor would be held in a center position. Since this is not physically possible, the rotor will be in constant motion in a tight limit cycle about the centered position. Although the rotor is in constant motion, the frequency of its limit cycle is limited only by the requirements of velocity and position sensing and switching. Thus, the frequency of the limit cycle is extremely high in comparison to the natural frequencies of the associated circuits and systems with which and in which the gyroscope is used. Consequently, the gyroscope rotor will appear to the rest of the circuitry as though it is in its average or centered position.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. An electrostatic support for supporting an electrically conductive member comprising means including a first source of DC potential for applying an electrostatic force to said member to tend to effect movement of said member in one direction, and means including a second source of DC potential for alternately applying an electrostatic force to said member to tend to effect movement of said member in an opposite direction.

2. An electrostatic support device for supporting an electrically conductive member in space comprising a pair of plates positioned on one side of said member, means for establishing a DC potential between said plates and said member, and switch means operatively coupled between said DC potential establishing means and said plates and responsive to the position of said member with respect to said plates for coupling and decoupling said DC potential to said plates so as to support said member in a substantially predetermined position.

3. An electrostatic support for supporting an electrically conductive member in space comprising at least one pair of plates positioned on one side of said conductive member, first and second DC power supplies serially connected between said pair of plates, and switch means operatively coupled between said power supplies and said pair of plates and responsive to the position of said member with respect to said plates for alternately coupling and decoupling said plates to said power supplies so as to substantially maintain said conductive member in a predetermined position.

4. An apparatus for maintaining an electrically conductive member supported in space comprising an electrically conductive spherical member having a plurality of axes intersecting at the center thereof, pairs of plates arranged symmetrically about each of said axes on opposite sides of said conductive member, separate means for establishing a DC potential between each of said pair of plates and said conductive member, and switch means operatively coupled between said DC potential establishing means and said plates and responsive to the position of said conductive member with respect to said plates for controlling the DC potential between said plates and said conductive member so as to maintain said conductive member in a substantially predetermined position.

5. An electrostatic support device for supporting an electrically conductive spherical member in space, said member having three mutually perpendicular axes intersecting at the center thereof, comprising six pairs of plates symmetrically arranged around said conductive member with two pairs of plates arranged along each of said axes and on opposite sides of said member, and separate means for establishing a DC potential between each of said pairs of plates and said conductive member in response to changes in the position of said member relative to said axes.

6. An apparatus for maintaining an electrically conductive member supported in space comprising at least two pairs of plates arranged on opposite sides of said conductive member, means for independently establishing an electrostatic force between each of said pairs of plates and said conductive member, and switch means operatively coupled between said force establishing means and said plates and responsive to the position of said conductive member with respect to said plates for controlling the application of said electrostatic force so as to control the position of said conductive member.

7. An electrostatic support device for supporting an electrically conductive spherical member in space, said member having three mutually perpendicular axes intersecting all the center thereof, comprising: six pairs of plates symmetrically arranged around said conductive member with two pairs of plates arranged along each of said axes and on opposite sides of said member; means for independently establishing a DC potential between each of said pairs of plates and said conductive member; a three-phase AC carrier generator; a pair of capacitors serially connected between the plates of each pair of plates; separate inductors connecting the junction of said pairs of capacitors to said generator, the two pairs of plates arranged along the same axis being connected to the same generator phase to form a balanced load, said inductors forming a resonant circuit with the capacitance of an associated pair of plates; means responsive to said resonant circuits for providing control signals as a function of the position of said member along said axis; and switch means operatively coupled between said potential establishing means and said plates and responsive to said control signals for controlling the DC potential between said plates and said conductive member so as to maintain said conductive member in a substantially predetermined position.

8. The device as claimed in claim 7 wherein said AC carrier generator provides a potential substantially smaller in magnitude than said DC potential.

9. An apparatus for maintaining an electrically conductive member supported in space, comprising:
at least two pairs of support plates positioned on opposite sides of said conductive members;
separate for establishing an electrostatic force between each of said pairs of support plates and said conductive member;
an AC power source having at least first and second output terminals, a separate inductor connected between the first terminal of said power source and each of said pairs of support plates, each of said inductors having an inductive reactance at the AC power source frequency greater than the capacitive reactance formed between each of said support plates and said conductive member with said conductive member equidistant from both said support plates, said conductive member having the same AC potential as the second terminal of said power source;

means for detecting the magnitude and phase of the voltage between said support plates and said second terminal of said AC power source; and switch means operatively coupled between said electrostatic force establishing means and each plate of said pairs of support plates and responsive to said detected voltage for controlling the application of said electrostatic force so as to maintain said conductive member substantially centered between said support plates.

10. An electrostatic support device for supporting an electrically conductive member in space, comprising:

at least a pair of plates positioned on opposite sides of said conductive member;

a source of DC potential having first and second terminals;

an AC power source having at least first and second output terminals;

individual series $L/C$ circuits connecting the first terminal of said AC power source to each of said plates, said $L/C$ circuits forming series resonant circuits at the frequency of said AC power source with the capacitance formed between each of said plates and said conductive member when said conductive member is substantially centered between said plates, said conductive member having the same potential as the second terminal of said AC power source and the first terminal of said source of DC potential;

means for detecting the amplitude and phase of the voltage between each of said plates and said second AC source terminal; and switch means responsive to said detected voltage for connecting the second terminal of said source of DC potential selectively to the plates of said pair so as to maintain said conductive member substantially center.

11. An electrostatic support for supporting an electrically conductive member in space comprising at least one pair of plates positioned on one side of said conductive member, a first and a second DC power supply serially connected across said pair of plates, the common connection between said first and second power supplies providing a point of reference potential, said conductive member having the same DC potential as said point of reference potential, and switch means operatively coupled between said power supplies and said pair of plates and responsive to the position and translational velocity of said member with respect to said plates for alternately connecting and disconnecting said plates to said power supplies so as to substantially maintain said conductive member in a predetermined position.

12. An apparatus for maintaining an electrically conductive member supported in space comprising an electrically conductive spherical member having a plurality of axes intersecting at the center of said member, pairs of plates arranged symmetrically about each of said axes on opposite sides of said conductive member, means for independently establishing a DC potential between each of said pairs of plates and said conductive member, and switch means operatively coupled between said potential establishing means and said plates and responsive to the position and translational velocity of said conductive member along said axes for controlling the application of said DC potential between said plates and said conductive member so as to maintain said conductive member in a substantially predetermined position.

13. An apparatus for maintaining an electrically conductive member supported in space comprising at least two pairs of plates arranged on opposite sides of said conductive member, separate means for establishing a DC potential between each of said pairs of plates and said conductive member, and switch means operatively coupled between said potential establishing means and said pairs of plates and responsive to the position and translational velocity of said conductive member with respect to said plate for controlling the application of said DC potential so as to control the position of said conductive member.

References Cited

UNITED STATES PATENTS

| | | | |
|---|---|---|---|
| 3,003,356 | 10/1961 | Nordsieck | 308—10 |
| 3,098,679 | 7/1963 | DeBoice | 308—10 |
| 3,221,563 | 12/1965 | Wing | 308—10 X |

MILTON O. HIRSHFIELD, *Primary Examiner.*

L. L. SMITH, *Assistant Examiner.*

UNITED STATES PATENT OFFICE
CERTIFICATE OF CORRECTION

Patent No. 3,338,644				August 29, 1967

James L. Atkinson et al.

It is hereby certified that error appears in the above numbered patent requiring correction and that the said Letters Patent should read as corrected below.

Column 8, line 41, for "all" read -- at --; line 70, after "separate" insert -- means --.

Signed and sealed this 15th day of October 1968.

(SEAL)
Attest:

Edward M. Fletcher, Jr.					EDWARD J. BRENNER
Attesting Officer					Commissioner of Patents